United States Patent

[15] 3,640,619

Huber

[45] Feb. 8, 1972

[54] CONTROL ARRANGEMENT FOR COPYING APPARATUS

[72] Inventor: Hans-Peter Huber, Munich, Germany

[73] Assignee: Agfa-Gevaert Aktiengesellschaft, Leverkusen, Germany

[22] Filed: Jan. 27, 1970

[21] Appl. No.: 6,198

[30] Foreign Application Priority Data

Jan. 29, 1969 Germany.....................P 19 04 253.6

[52] U.S. Cl...................................355/36, 355/71, 355/83
[51] Int. Cl........................................................G03b 27/76
[58] Field of Search......................355/35, 36, 71, 80, 83, 88

[56] References Cited

UNITED STATES PATENTS 3,531,199   9/1970   Burger et al. .......................355/83 X
3,241,441   3/1966   Barbour et al...........................355/36
3,426,357   2/1969   Paulus..................................355/83 X Primary Examiner—Samuel S. Matthews
Assistant Examiner—Fred L. Braun
Attorney—Michael S. Striker

[57] ABSTRACT

An arrangement for controlling and shortening the exposure times of copying apparatus adapted to two colors on an original or master to be copied. The light source in the copier transmits light of the two colors along a path into which blocking filters may be selectively inserted. One blocking filter is provided for each one of the colors. Two adjustable timing generators control the insertion of the blocking filters into the light path so that the blocking filter for the one color requiring shorter exposure is inserted into the light path at either the beginning or the end of the exposure. Operational amplifiers with capacitor feedback operate in conjunction with potentiometers for generating the appropriate time intervals for the exposure.

9 Claims, 3 Drawing Figures

PATENTED FEB 8 1972

3,640,619

INVENTOR
HANS-PETER HUBER
BY 3,640,619

CONTROL ARRANGEMENT FOR COPYING APPARATUS

BACKGROUND OF THE INVENTION

The present invention resides in an arrangement for controlling the exposure of copying or duplicating paper or materials which have different gradation for different colors. The arrangement is adapted to gradation variation in two different colors. The color components corresponding to the contrast range of the copying or duplicating paper are determined, and blocking filters for each one of the two colors may be inserted into the light path of a source which transmits both colors.

In an arrangement which is well known in the art and is of the preceding species, the exposures in the two colors take place in sequence after each other. The duration of the entire exposure time is made dependent upon the maximum or minimum contrast of the material to be copied, and the relationship between both color exposures corresponds to the contrast range, so that a setting is applied in accordance with the difference between the maximum and minimum contrast. To control the exposure, an electronic time generator is provided which controls the color exposure or illumination through two potentiometers. The apparatus is described in the pending patent application Ser. No. 714,188 filed Mar. 19, 1968, now U.S. Pat. No. 3,531,199 and is adapted to standardizing of printed matter from the viewpoint of contrast range and maximum or minimum contrast. Thus, the apparatus functions with very high accuracy. The operating speed of the apparatus is, however, not particularly high, and an increase in the intensity of the light source of the copier serves only to accelerate the limitation of the operating speed. Accordingly, it is an object of the present invention to modify such apparatus in order to realize shorter copying times.

In accordance with the present invention, two adjustable time generators are provided in an apparatus of the aforementioned species for conventional time exposures without filters. The two adjustable timing generators control each one of the color filters, and the blocking filter for the shorter color exposure lies at the beginning or end of the exposure in the light path.

In a copier of the present invention, the exposure time is shortened to the duration of the longer individual exposure which would prevail, since the shorter exposure which would ordinarily prevail takes place within this time interval. In the optimum case, when both of the partial exposures last equally long, the copying time can be shortened by one half.

SUMMARY OF THE INVENTION

An arrangement for shortening the exposure time of copiers adapted to originals with two colors and copying or duplicating paper with different gradation for different colors. The light source in the copier transmits light of the two colors along a path into which blocking filters for each one of the two colors may be inserted. Two adjustable timing generators control respectively one of the blocking filters so that the one blocking filter associated with the color requiring normally shorter exposure, is inserted into the light path at either the beginning or the end of the exposure. The color components are determined by the contrast range of the matter to be copied from the original onto the duplicating paper.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
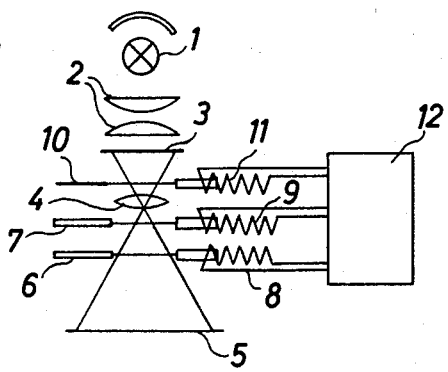
FIG. 1 is a schematic diagram and shows the principle of operation of the copier, in accordance with the present invention.

Referring to the drawing, and in particular to FIG. 1, a copying light source 1 transmits substantially white copying light. Through means of a double-condensing lens 2, this light from the source 1 is directed onto the surface, original or master 3, which is to be copied. The material to be copied from the article 3 is imaged upon copying or duplicating paper 5, through an objective lens 4. At any position or point along the path of the light beam and within the region of narrowed-down cross section, color filters 6 and 7 has, for example, yellow and blue filters, are inserted at the objective lens 4. These filters can be drawn into the light path through electro magnetic solenoids 8 and 9. When the solenoids or electromagnets are turned off or deenergized, the filters are again removed from the light path through spring arrangements. A shutter 10 is similarly arranged to be controlled through a shutter solenoid or electromagnet 11. The three solenoids or electromagnets 8, 9 and 11 are connected to a timing unit which is shown in detail in FIG. 2.

Figure 2:
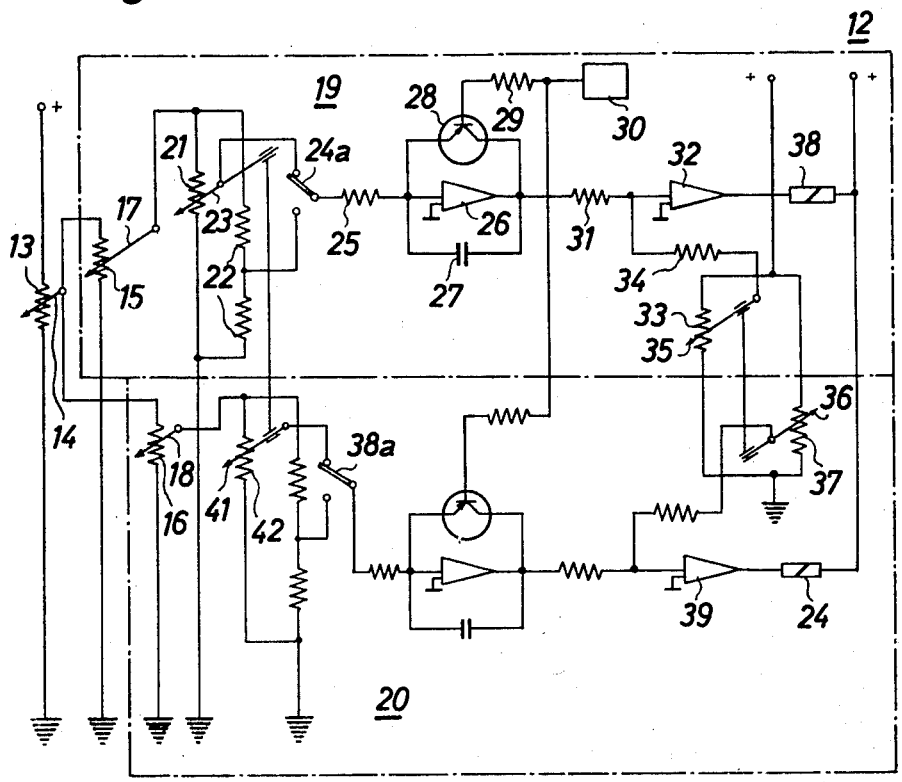
FIG. 2 is an electrical circuit diagram of a timing arrangement for controlling the apparatus of FIG. 1.

In the circuit arrangement of FIG. 2, a first potentiometer 13 is connected to ground potential with one terminal of its winding, whereas the other terminal of the winding is connected to a source of constant DC voltage of, for example, 15 volts. The sliding contact 14 of this potentiometer is connected to the windings of two further potentiometers 15 and 16. These potentiometers also serve as voltage dividers and the other terminals of the windings of these potentiometers 15 and 16, are connected to ground potential. The sliding contacts 17 and 18 of these two further potentiometers are connected to the inputs of two timing generators 19 and 20 which are of identical construction. Accordingly, for purposes of illustration and description, only the time generator 19 will be described in detail.

In the circuit of the time generator 19, the sliding contact 17 is connected to a still further voltage divider in the form of potentiometer 21, as well as the voltage divider comprised of fixed resistors 22. The sliding contact 23 of the potentiometer 21, and the tap of the voltage divider 22 lead to the switching contact 24a of a relay 24, to be described. A resistor 25 lies at the input of an operational amplifier 26 which has a feedback coupling through capacitor 27. This capacitor is bridged or connected in parallel with the emitter-collector path of a switching transistor 28. The base of this transistor 28 is connected to a pulse generator 30, through a resistor 29.

The output of the amplifier 26 is applied to the input of a further operational amplifier 32, through a resistor 31. The amplifier 32 functions as a current comparator. The current for the comparator amplifier 32, is derived from a potentiometer 33, by way of a fixed resistor 34. The winding of the potentiometer 33 is connected between ground potential and a constant positive voltage. The sliding contact 35 of the potentiometer 33 is mechanically coupled to the sliding contact 36 of a potentiometer 37 within the timing generator 20. Through the mechanical coupling of the sliding contacts of these two potentiometers 33 and 37, the two potentiometers are made functionally identical. Thus, the potentiometer 37 has also connected its winding across the same positive voltage source as the potentiometer 33. The two sliding contacts 35 and 36 may be mechanically coupled together by mounting the two potentiometers, for example, on the same shaft.

The output of the comparator amplifier 32 or summing amplifier 32, is connected by way of a relay 38, to the electromagnet or solenoid 8 of the filter 6. At the same time, the output of the summing amplifier 32 may also be directly connected to this solenoid 8. The relay 38 actuates, simultaneously, a switching contact 38a in the circuit of the time generator 20. This switching contact 38a of the relay 38 corresponds to the contact 24a in the time generator 19, which is actuated or operated by the relay 24. The relay 24 for controlling the state of the switching contact 24a, is connected to a comparator or summing amplifier 39 in the timing generator 20. This summing amplifier 39 corresponds to the summing amplifier 32 in the timing generator 19.

The sliding contact 23 of the potentiometer 21 is mechanically coupled to the slider or sliding contact 41 of the potentiometer 42 within the circuit of the timing generator 20. The potentiometer 21 corresponds functionally to the potentiometer 42. The coupling between these two potentiometers is such that the sum of the resistance of the two windings of the potentiometers is maintained constant through the coupling, while allowing separate variation.

Figure 3:
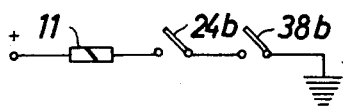
FIG. 3 is a partial circuit diagram of the control circuit used to control the operation of the apparatus of FIG. 1.

FIG. 3 illustrates the circuit for the shutter solenoid or electromagnet 11 which lies in series with a switching contact 24b of the relay 24, as well as the switching contact 38b of the relay 38. Thus, the shutter can be only closed when both relays 24 and 38 are energized.

In operation of the arrangement of the present invention, several calibration procedures must be carried out before the beginning of the copying process. Thus, the sliding contacts 17 and 18 of the two potentiometers 15 and 16 must be set corresponding to the spectral sensitivity of the copying paper or copying material, for the purpose of processing the copying or printing materials for the two colors to be copied.

Such a setting procedure of these two potentiometers can be accomplished in a manner already well known in the art.

The two potentiometers 21 and 42 area, furthermore, to be set. These potentiometers are connected into the circuits through the switching contacts 24a and 38a, when an exposure takes place without a filter. The calibration of the sensitivity resistors of potentiometers 15 and 16 is used to set the color relationships in the extreme position of these sliding contacts 35 and 36. Consequently, the operating time intervals of the time generators 19 and 20 are determined through the voltage divider 22 and the corresponding resistors within the time generator 20, so that when a color filter prevails, a blackening or darkening of the copying material results for that one color. The color filters do not block light only within their designated regions. Instead, these filters also exhibit absorption characteristics within the used light region. Furthermore, additional light is lost through reflection at the filter surfaces. Accordingly, the timing generators 19 and 20 must operate more rapidly when no filters are used with the illumination, than when a blocking filter prevails which is necessary for the other color in the light path. This arrangement is essential if overexposures are not to be realized.

The setting of potentiometers 21 and 42 can be accomplished through a photoelectric measurement taken in the plane of the copying or duplicating paper 5. With this arrangement, a greater feed voltage is generated for greater light intensities through means of a transducer sensitized by a corresponding Filter, compared to the intensity prevailing with a blocking filter. The resultant feed voltage is applied to the time generator and results in a corresponding shortening of the operating time.

When the spectral sensitivity of the copying or duplicating paper does not sufficiently correspond to the spectral sensitivity of the light transducer, a sensitivity test may be carried out. For this purpose, an exposure is first carried out with identical exposure times in both colors, so that the exposure is carried out without filters. The coupling of the two sliding contacts 41 and 23 is thereby to be made such that the sum of the illumination produces the same darkening or blackening effect as realized with color illuminations carried out in sequence with identical settings. The blackening or darkening can, of course, coincide with a predetermined blackening value, since the gradation was not taken into account.

In a second step or procedure, an opposite setting is to be carried out for the two sliding contacts 41 and 23, on the basis of the gradation value which is to be expected. The setting of the potentiometers 21 and 42 is thereby not particularly critical, since the setting of the sum resistance values of the two potentiometers only influences a portion of the entire exposure time. Furthermore, the setting region of these potentiometers may be limited to a substantially small value corresponding to the maximum fluctuating region which is possible. Any prevailing error is, thereby, only of a secondary type. An error resulting at the setting of the relationships of the two measured values, is only of a third-order type. When the spectral sensitivity of the substance used for the copying process is substantially constant, it is adequate to carry out this calibration for the apparatus only once. Changes or variations can become necessary in all cases as a result of interchanging the filters or the light source.

After setting of the resistive windings 21 and 42, the sliding contact 14 of the potentiometer 13 may be set to the corresponding maximum of minimum contrast of the article to be copied. This may be carried out in accordance with procedures already well known in the art. The two potentiometers 35 and 37 are set to the corresponding difference between the maximum and minimum contrast, or corresponding to the contrast range of the article or item to be copied.

Assume, now, that the shutter 10 is opened through associated switching means, and voltage is applied to the potentiometer 13. As a result, the charging capacitors 27 of the timing generators 19 and 20 become discharged through the transistors 28. An exposure of the copying or duplicating paper 5 then commences in both of the colors used in the copy. Through means of the switching contacts 24a and 38a, the potentiometers 21 and 42 are next connected in the circuit of the timing generators. Corresponding to the settings of the potentiometers 33 and 37, voltage now rises across the capacitors 27 until the current flowing through the resistors 31 connected to the amplifiers 32 or 39, exceeds the current flowing through the resistor 34. At the instant that the currents through the resistors 31 and 34 are equal, the corresponding comparator circuit or amplifier 32 or 39 switches and energizes the corresponding relay. If, for example, the relay 38 is first energized through current applied to it, then the solenoid or electromagnet 8 becomes energized and the blue filter 6 is transferred into the light path. The blue exposure is thereby terminated, whereas the yellow exposure is continued through the blue filter.

To take into account the now-weaker intensity, the contact 38a is switched by the relay 38, so that the combination of fixed resistors are connected into the circuit of the timing generator 20, instead of the potentiometer 42. The voltage at the input of the amplifier becomes thereby reduced, whereas the time for actuating the comparator amplifier 39 becomes increased. When this time interval has also expired, the relay 24 becomes energized and closes the second switching contact 24b in series with the shutter solenoid 11. As a result, the shutter 10 becomes closed. Through a switching contact of the relay 38 in series with the solenoid 9, it is not possible to prevent the insertion of the yellow filter which is no longer necessary within the light path. Prior to the beginning of the new exposure, the transistors 28 are made to conduct through a pulse from the pulse generator 30, so that the charging capacitors 27 become discharged. With the release of the relays 24 and 38 at the beginning of the next exposure, the shutter is also again reopened.

The two blocking filters can also be red and blue instead of yellow and blue. In that event, however, a green filter must always lie in the intermediate region within the light path, in order to avoid variations which are too large during the filter insertion.

If the filter is selected so that the transmissibility regions overlap partially, it is possible that the resistance value of the potentiometer 21 and 42 be larger than the alternate fixed resistors 22 in order to realize the proper illumination or exposure. This can also be taken into account through corresponding design of the potentiometers 21 and 42.

The filtered exposures can also take place before the simultaneous exposure in both colors. Since the color illuminating time intervals are already determined through setting of the apparatus in correspondence to maximum and minimum contrast, the longer lasting exposure can be commenced correspondingly earlier. A circuit adapted for this purpose differs in aspects from that described in FIG. 2.

It will be understood that each of the elements described above, or two or more together, may also find a useful application in other types of constructions differing from the types described above.

While the invention has been illustrated and described as embodied in an arrangement for controlling the exposure in copiers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. An arrangement for controlling the exposure of copying means having different gradation for different colors comprising, in combination, a light source transmitting light of two colors along a predetermined path; blocking filter means for each one of said two colors insertable into said path; and adjustable timing means for controlling each one of said blocking filter means so that the blocking filter for the one color requiring shorter exposure is inserted into said path at a predetermined time within the exposure, the color components of said two colors being determined by the contrast range of a matter to be copied onto said copying means, said timing means comprising two timing generators each with control means, each of said timing means varying the operating time of the other timing generator for the other color upon energization of the respective control means, said timing generators controlling said control means for the insertion of said filters, so that said path is free of said filter means at the beginning or end of the exposure time.

2. The arrangement as defined in claim 1 wherein said predetermined time is substantially near the beginning of said exposure.

3. The arrangement as defined in claim 1 wherein said predetermined time is substantially near the end of said exposure.

4. The arrangement as defined in claim 1 including adjustable resistor means in each of said timing generators; fixed resistor means within said timing generators; and switching means for connecting into the circuit of the respective timing generator selectively said adjustable resistor means and said fixed resistor means.

5. The arrangement as defined in claim 4 including further adjustable resistor means for setting the sensitivity of said copying means; operational amplifying means with capacitor feedback for forming a time dependent voltage, said first-mentioned adjustable resistor means being arranged between said further resistor means and said operational amplifier means, said fixed resistors being a voltage divider.

6. The arrangement as defined in claim 5 wherein said fixed resistors of said voltage divider comprise two series-connected fixed resistors.

7. The arrangement as defined in claim 4 including movable shutter means in said path for terminating said exposure; and electromagnetic means mechanically linked to said shutter means and electrically controlled by said switching means for controlling the state of said shutter means.

8. The arrangement as defined in claim 7 wherein said switching means comprises a relay.

9. An arrangement for controlling the exposure of copying means having different gradation for different colors comprising, in combination, a light source transmitting light of two colors along a predetermined path; blocking filter means for each one of said two colors insertable into said path; adjustable timing means for controlling each one of said blocking filter means so that the blocking filter for the one color requiring shorter exposure is inserted into said path at a predetermined time within the exposure, the color components of said two colors being determined by the contrast range of a matter to be copied onto said copying means, said timing means comprising two timing generators each with control means, each of said timing generators varying the operating time of the other timing generator for the other color, said timing generators controlling said control means for the insertion of said filters; adjustable resistor means in each of said timing generators; fixed resistor means within said timing generators; and switching means for connecting into the circuit of the respective timing generator selectively said adjustable resistor means and said fixed resistor means, said adjustable resistor means comprising potentiometer means in each of said timing generators, the sliding contact of said potentiometers being mechanically coupled so that the sum of the resistances of both said potentiometers is variable.

* * * * *